(12) United States Patent
Kwok

(10) Patent No.: US 12,109,840 B2
(45) Date of Patent: Oct. 8, 2024

(54) FOLDING WHEEL AND PORTABLE APPLIANCE

(71) Applicant: PERTEC ELECTRONICS COMPANY LIMITED, Hong Kong (CN)

(72) Inventor: Yu Ming Kwok, Hong Kong (CN)

(73) Assignee: PERTEC ELECTRONICS COMPANY LIMITED, Hong Kong (CN)

( * ) Notice: Subject to any disclaimer, the term of this patent is extended or adjusted under 35 U.S.C. 154(b) by 300 days.

(21) Appl. No.: 17/435,701

(22) PCT Filed: Sep. 17, 2020

(86) PCT No.: PCT/CN2020/115741
§ 371 (c)(1),
(2) Date: Sep. 2, 2021

(87) PCT Pub. No.: WO2021/052385
PCT Pub. Date: Mar. 25, 2021

(65) Prior Publication Data
US 2022/0355614 A1    Nov. 10, 2022

(30) Foreign Application Priority Data

Sep. 18, 2019 (CN) .......................... 201910882060.3

(51) Int. Cl.
*B60B 25/02* (2006.01)
*B60B 3/00* (2006.01)
*B60B 19/04* (2006.01)

(52) U.S. Cl.
CPC .............. *B60B 25/02* (2013.01); *B60B 3/002* (2013.01); *B60B 19/04* (2013.01); *B60B 2900/351* (2013.01)

(58) Field of Classification Search
CPC ................................ B60B 19/04; B60B 25/02
See application file for complete search history.

(56) References Cited

U.S. PATENT DOCUMENTS

| 8,833,864 | B2 * | 9/2014 | Solheim | .................. B60B 25/02 301/15 |
| 2022/0274666 | A1 * | 9/2022 | Kwok | ..................... B60B 19/04 |

OTHER PUBLICATIONS

Australian Patent Office, Examination Result, dated Jun. 29, 2023.
(Continued)

*Primary Examiner* — Jason R Bellinger
(74) *Attorney, Agent, or Firm* — George G. Wang; Bei & Ocean

(57) ABSTRACT

Disclosed are a folding wheel and a portable appliance. The folding wheel includes: a wheel body, wherein the wheel body include two wheel plates that can be spliced with each other, and a notched area is formed therebetween when the two wheel plates are spliced with each other; a first connecting element disposed in the notched area; a first slide rail mechanism, at least part of which is disposed on the first connecting element, and remaining parts of which are disposed on respective wheel plates, wherein the first slide rail mechanism includes a first rail groove and a first rotating shaft inserted into the first rail groove, such that the two wheel plates can be spliced with or separated from each other along the first rail groove via the first rotating shaft, and can be flipped relative to the first connecting element via the first rotating shaft; the folding wheel is foldable, wherein when the two wheel plates are pulled away from each other, the two wheel plates slide away from each other along the first rail groove. The two wheels may be flipped, wherein when the two wheel plates are folded towards each other, the portable appliance with reduced folded size facilitates the user to pack or carry.

12 Claims, 13 Drawing Sheets

(56) References Cited

OTHER PUBLICATIONS

Vietnam Patent Office, Notice of Examination report, dated Mar. 14, 2024.
Indonesian Patent Office, Examination search report, dated Dec. 8, 2023.
Indian Patent Office, Hearing Notice, dated Jan. 16, 2024.
Korean Patent Office, Office action , dated Mar. 30, 2024.
Canadian Patent Office, Examination search report, dated Jun. 8, 2023.
Singapore Patent Office, Search report, dated Apr. 25, 2023.
New Zealand Patent Office, Examination report No. 1 , dated Oct. 31, 2023.
European Patent Office, Search report, dated Sep. 21, 2023.

\* cited by examiner

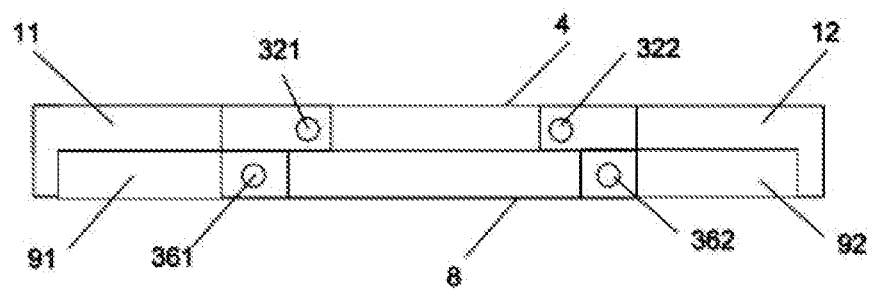
Fig. 17
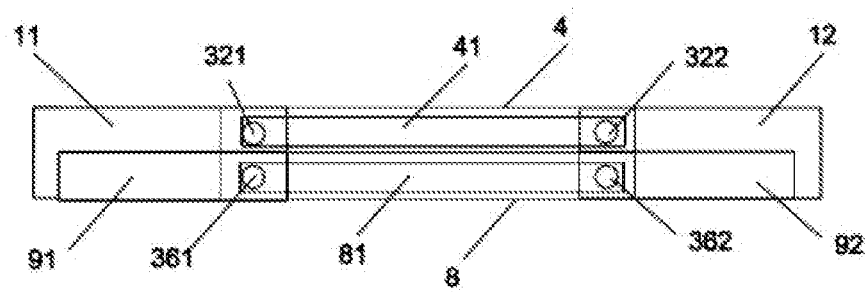
Fig. 18
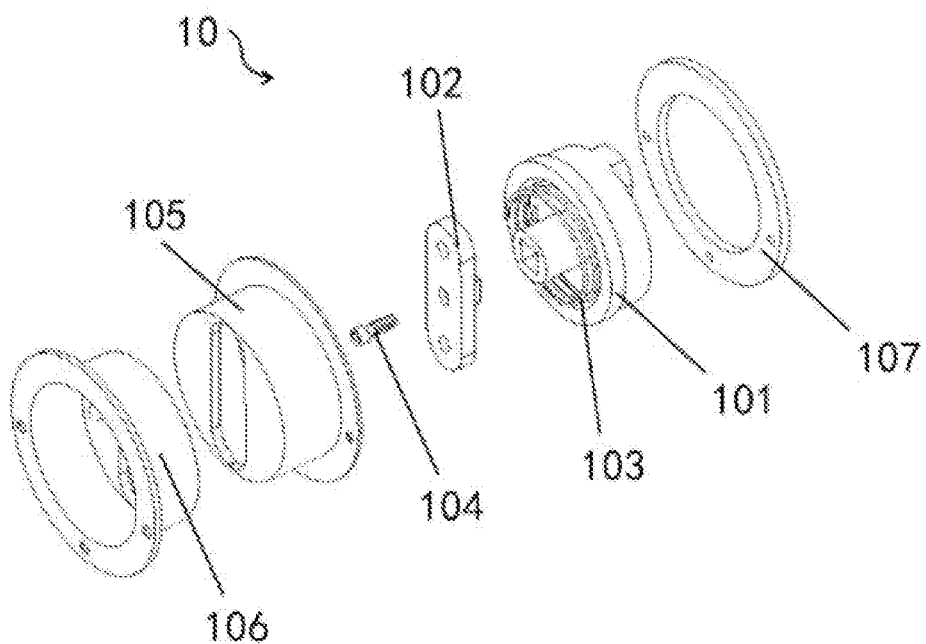

FOLDING WHEEL AND PORTABLE APPLIANCE

FIELD

The disclosure relates to foldable portable appliances, and more particularly relates to a folding wheel and a portable appliance having the folding wheel.

BACKGROUND

Wheeled portable appliances are common articles, for example bicycles, kids' bikes, and strollers, as well as some kids' toys. Such appliances are generally designed lightweight, even foldable, so as to be convenient to carry and pack.

However, for conventional portable appliances, their wheels usually have a large footprint, such that they can be difficult to pack. When designing a foldable appliance, the balance between serving strength and folding convenience should be the first thing to consider. For the portable appliance, it is always the wheels that bear stress and load; however, it is not easy to engineer a pragmatically folding wheel. Folding wheels appropriate for portable appliances can hardly be found.

SUMMARY

Technical Problem

For example, the main folding parts of a conventional folding bicycle are the handlebar and the main frame, but the wheels cannot be folded. After the main frame and the handlebar are folded between the two wheels, the wheels still occupy a relatively large space, such that the folded bicycle has a relatively large footprint and is still inconvenient to carry and pack.

Technical Solution

In view of the above, one aspect of the disclosure provides a folding wheel, comprising: a wheel body comprising two wheel plates capable of being spliced with each other, wherein a notched area is formed when the two wheel plates are spliced with each other; a first connecting element arranged in the notched area; a first slide rail mechanism, at least part of which is arranged on the first connecting element, and remaining parts of which are arranged on respective wheel plates, wherein the first slide rail mechanism comprises a first rail groove and a first rotating shaft embedded into the first rail groove, the two wheel plates being capable of splicing with or separating from each other along the first rail groove via the first rotating shaft and being cpable of flipping relative to the first connecting element via the first rotating shaft; and a securing mechanism configured to secure the two wheel plates in a mutually spliced state.

Another aspect of the disclosure provides a portable appliance including the folding wheel described above.

Beneficial Effects of the Disclosure

Beneficial Effects

The wheel body of the folding wheel may be locked to the spliced state by the securing mechanism, so as to be ready for use. To pack the portable appliance, a user may fold the folding wheel. The user may pull the two wheel plates away from each other, while the first connecting element and the first rotating shaft disposed on the first connecting element maintain stationary, wherein the two wheel plates slide away from each other along the first rail groove, respectively. After the two wheel plates have been pulled away from each other, the first rotating shaft is still retained in the first rail groove. Now, the user may flip the two wheel plates and fold them towards each other. After the folding, the wheel body has a reduced footprint, facilitating the user to pack or carry.

BRIEF DESCRIPTION OF THE SEVERAL VIEWS OF THE DRAWINGS

To elucidate the disclosure, the drawings will be briefly introduced below:

FIG. 17 is a sectional view of the wheel body and the plate body before rotation in the second embodiment;

FIG. 18 is a sectional view of a wheel body and a plate body before rotation in a third embodiment;

FIG. 19 is an assembled schematic diagram of a plug assembly according to a fourth embodiment;

DETAILED DESCRIPTION

First Embodiment

The disclosure is illustrated mainly with a foldable bike as an example. Other foldable and portable appliances may also have similar structures and beneficial effects, which will not be discussed in detail herein.

Figure 1:
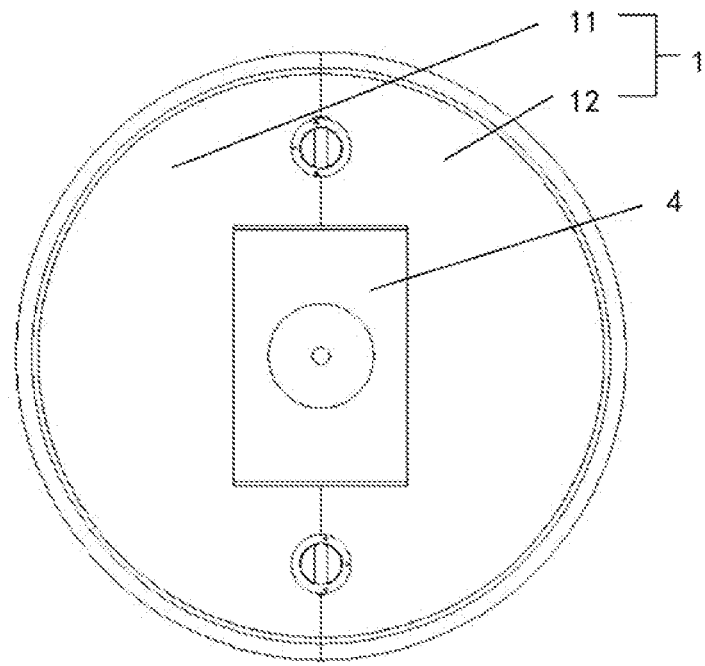
FIG. 1 is a structural schematic diagram of a wheel body of a folding wheel in a spliced state according to a first embodiment.
Figure 2:
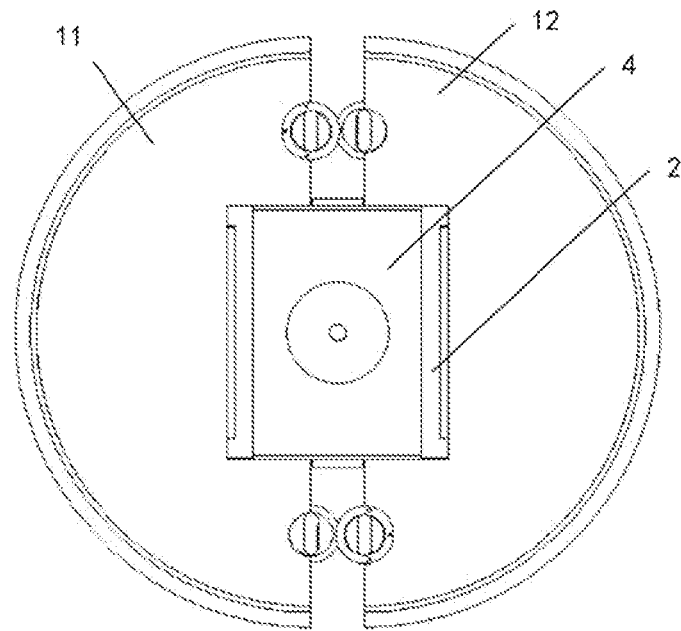
FIG. 2 is a structural schematic diagram of the wheel body of the folding wheel in a separated state in the first embodiment.
Figure 3:
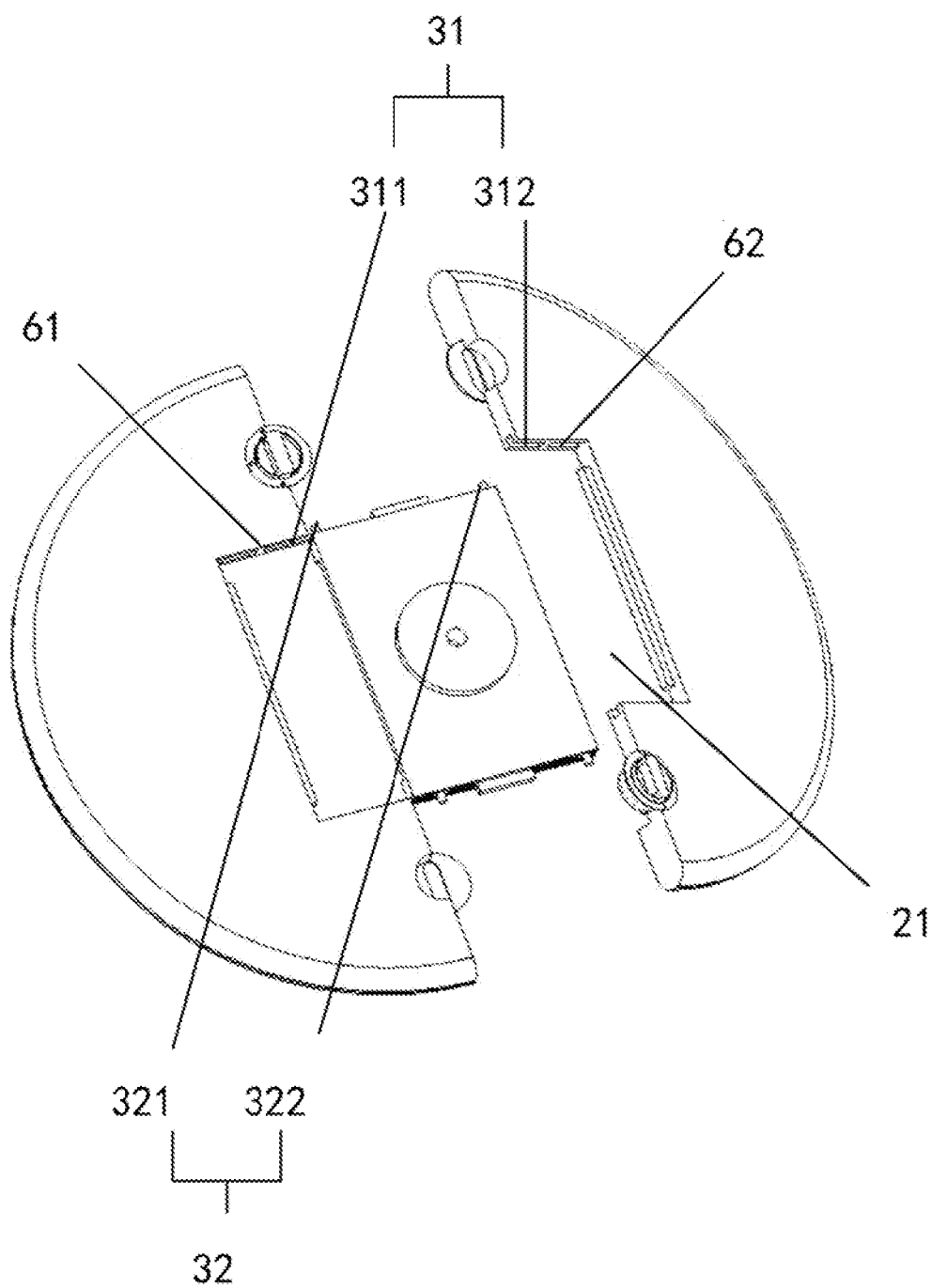
FIG. 3 is an exploded structural view of the being flipped wheel body of the folding wheel in the first embodiment.

In the first embodiment, there is provided a folding wheel, as shown in FIGS. 1 to 3, comprising: a wheel body 1 comprising two wheel plates that are capable of being spliced with each other, wherein a notch 21 is provided for each of the two wheel plates, such that when the two wheel plates are spliced with each other, the two notches 21 are fitted to form a notched area 2; a first connecting element 4 connected between the two wheel plates and disposed in the notched area 2; a first slide rail mechanism, at least part of which is disposed on the first connecting element 4 and remaining parts of which are disposed on the two wheel plates; and a securing mechanism for securing the two wheel plates in a mutually spliced state.

The two wheel plates may comprise a left wheel plate 11 and a right wheel plate 12. The first slide rail mechanism may comprise: a first rail groove 31 and a first rotating shaft 32 embedded in the first rail groove 31. The first rail groove 31 comprises: a first left rail portion 311 provided on the left wheel plate 11, and a first right rail portion 312 provided on the right wheel plate 12. There may also be provided two first rotating shafts 32: a first left rotating shaft 321 and a first right rotating shaft 322 disposed at two ends of the first connecting element 4 on the same side, respectively, wherein the direction in which the first left rotating shaft 321 and the first right rotating shaft 322 face each other is the direction in which the wheel plates are spliced. The first left rail portion 311 and the first right rail portion 312 are both arranged along the splicing direction, wherein the first left rotating shaft 321 may be slidably inserted into the first left rail portion 311; and the first right rotating shaft 322 may be slidably inserted into the first right rail portion 312.

When the wheel body 1 is disposed at a spliced position shown in FIG. 1, the first connecting element 4 is located in the notched area 2. The first connecting element 4 may be engaged with the wheel plates in the axial direction of the first rotating shaft 32, or there may have a gap therebetween. When a gap is existent between the first connecting element 4 and the wheel plates, the first connecting element 4 and the wheel plates are connected only via the first rotating shaft 32; because the first rotating shaft 32 needs to transmit a force enabling synchronous rotation between the first connecting element 4 and the wheel body 1, it is highly demanding on rigidity of the first rotating shaft 32. The first connecting element 4 in this embodiment is fully embedded in the notched area 2, wherein the side edges of the first connecting element 4 are engaged with the wheel plates, respectively. The first rotating shaft 32 is disposed at one side edge of the first collecting element 4, and the first rail groove 31 is provided on the walls of the wheel plates opposite to the first rotating shaft 32 to ensure synchronous rotation between the wheel body 1 and the first connecting element 4.

Accordingly, the left wheel plate 11 may slide along the first left rail portion 311 via the first left rotating shaft 321, the right wheel plate 12 may slide along the first right rail portion 312 via the first right rotating shaft 322. Since the first left rotating shaft 321 and the first right rotating shaft 322 are both of an axial body, the left wheel plate 11 may flip relative to the first connecting element 4 about the axial center of the first left rotating shaft 321, and the right wheel plate may flip relative to the first connecting element 4 about the axial center of the first right rotating shaft 322.

Figure 4:
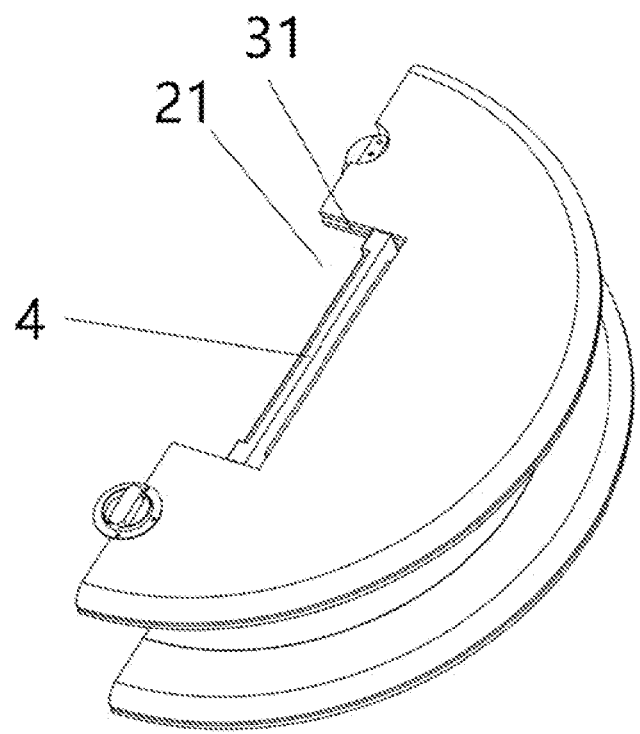
FIG. 4 is a structural schematic diagram of the folded wheel body of the folding wheel in the first embodiment.
Figure 5:
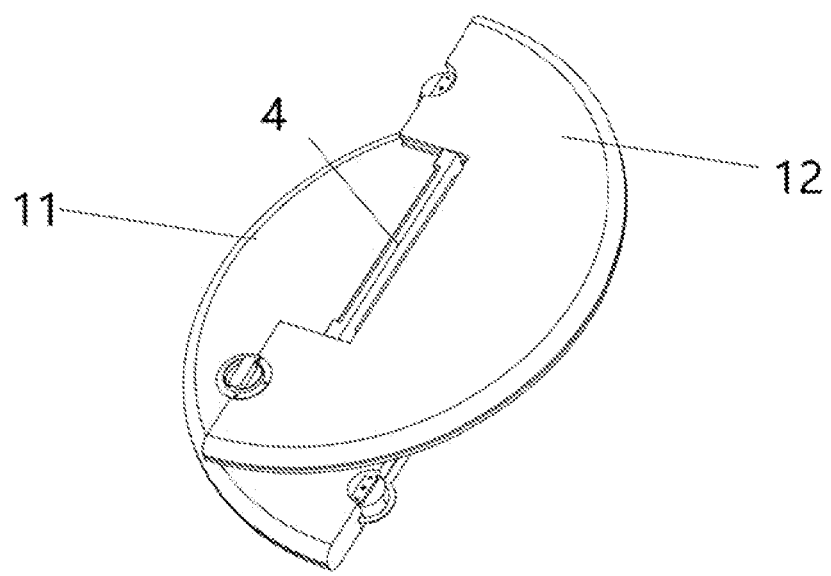
FIG. 5 is a structural schematic diagram of the folded wheel body of the folding wheel in the first embodiment.

In the spliced state shown in FIG. 1, the splicing faces of the two wheel plates fully abut against each other, such that neither of the wheel plates can be flipped relative to the first connecting element 4. To fold and pack the spliced wheel body 1, in conjunction with FIGS. 2 and 3, the user first needs to grip the left wheel plate 11 and the right wheel plate 12 to pull them away from each other, wherein the first connecting element 4, and the first left rotating shaft 321 disposed on the first connecting element 4, and the first right rotating shaft 322 maintain stationary, while the two wheel plates slide away from each other along the first left rail portion 311 and the first right rail portion 312, respectively. When the abutting faces of the two wheel plates are pulled apart from each other enough far, the first rotating shaft 32 is still disposed in the first rail groove 31; now the user can flip the left wheel plate 11 and the right wheel plate 12. FIGS. 4 and 5 illustrate two flipped states of the wheel body 1. As shown in FIG. 4, when the left wheel plate 11 and the right wheel plate 12 are folded towards each other, the folded wheel body 1 has a relatively small footprint, facilitating the user to pack or carry.

To minimize the footprint of the folded wheel body 1, the two wheel plates in this embodiment are both of a semi-circular shape with the same size. After the wheel body 1 is folded, the two wheel plates are symmetrical, avoiding space occupation of additional projection occurring at one side. Of course, the two wheel plates may have minor differences in shape and size. Since the two wheel plates have the same shape and size, the first connecting element 4 may be disposed in the middle of the wheel body 1, such that the wheel axle of the bicycle runs through the central position of the first connecting element 4 to drive the wheel body 1 to rotate.

As illustrated in FIG. 4, after the two wheel plates are separated from each other and flipped relative to the first connecting element 4, the space in the notches 21 is still not utilized, which increases post-folding footprint. In actual operations, after the two wheel plates are flipped relative to the first connecting element 4, the first connecting element 4 may slide further along the first rail groove 31 so as to be snapped in the notches 21 of the wheel plates. Different from splicing of the wheel plates, the first connecting element 4 is snapped into the notches 21 of the flipped wheel plates along the thickness direction; in this way, the space in the notches 21 becomes utilized, further reducing the footprint of the folded wheel body 1.

The two spliced wheel plates are locked by a securing mechanism so as to avoid potential risks such as splitting of the wheel body 1 during riding. The securing mechanism may have various implementations, including clamping, screwing, etc. With screwing as an example, two semi-circular projections may be provided on the two wheel plates, respectively, wherein a threaded hole is provided on each semi-circular projection, the threaded holes being staggered in thickness direction of the wheel plates. When the two wheel plates are spliced, the threaded holes in the two semi-circular projections coincide along the thickness direction, such that the user may lock the two wheel plates by inserting a bolt through both of the threaded holes. To ensure securing reliability, in this embodiment, two locking portions are provided on each wheel plate, respectively, wherein the two locking portions are symmetrical relative to the axial center of the wheel body 1.

Figure 6:
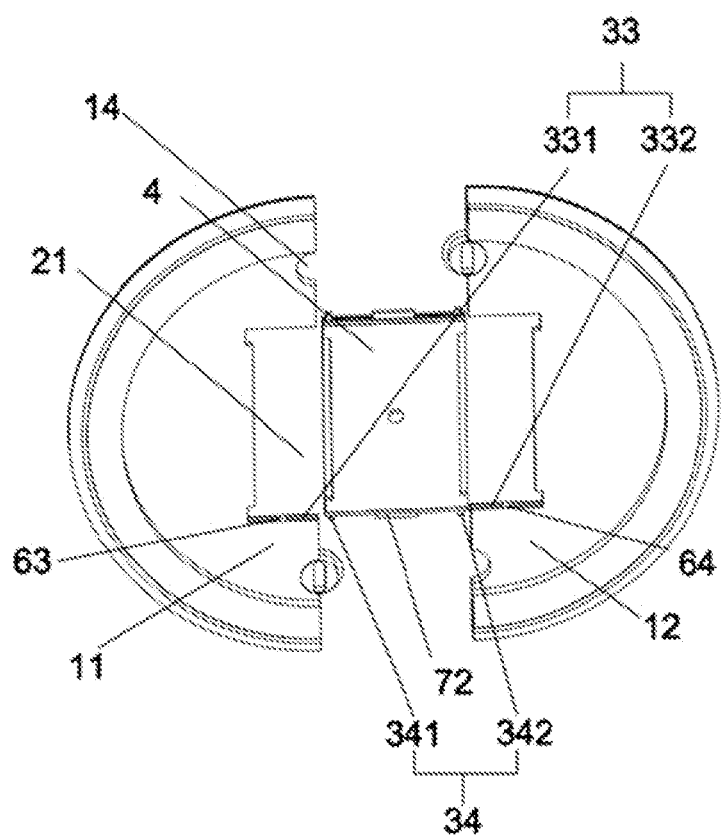
FIG. 6 is an exploded structural view of the folding wheel in the first embodiment.

When folding the wheel body, the left wheel plate 11 rotates about the first left rotating shaft 321, and the right wheel plate 12 rotates about the first right rotating shaft 322, wherein the first left rotating shaft 321 and the first right rotating shaft 322 are disposed at the same side of the first connecting element 4. To ensure flipping stability of the wheel body, the folding wheel may further comprise: a second slide rail mechanism. As illustrated in FIG. 6, similar to the first slide rail mechanism, the second slide rail mechanism is at least partially disposed on the first connecting element 4, comprising: a second rail groove 33 and a second rotating shaft 34 embedded into the second rail groove 33, wherein the second rotating shaft 34 and the first rotating shaft 32 are disposed at two opposite sides of the first connecting element 4, and the second rail groove 33 is also disposed at the side opposite to the first rail groove 31.

The second rail groove 33 may comprise: a second left rail portion 331 provided on an inner wall of the notch 21 of the left wheel plate 11, and a second right rail portion 332 provided on an inner wall of the notch 21 of the right wheel plate 12. Two second rotating shaft 34 are provided: a second left rotating shaft 341 slidably inserted into the second left rail portion 33, and a second right rotating shaft 342 slidably inserted into the second right rail portion 332, respectively. The second left rotating shaft 341 and the first left rotating shaft 321 may be coaxially arranged, such that when the left wheel plate 11 is sliding, the first left rotating shaft 321 and the second left rotating shaft 341 slide synchronously so as to maintain balanced, avoiding sideslip of the wheel plates during sliding. Meanwhile, when rotating, the left wheel plate 11 may rotate about the axial line common to the first left rotating shaft 321 and the second left rotating shaft 341, ensuring stability when the wheel plates are rotating. It is also the case for the right wheel plate 12.

Figure 7:
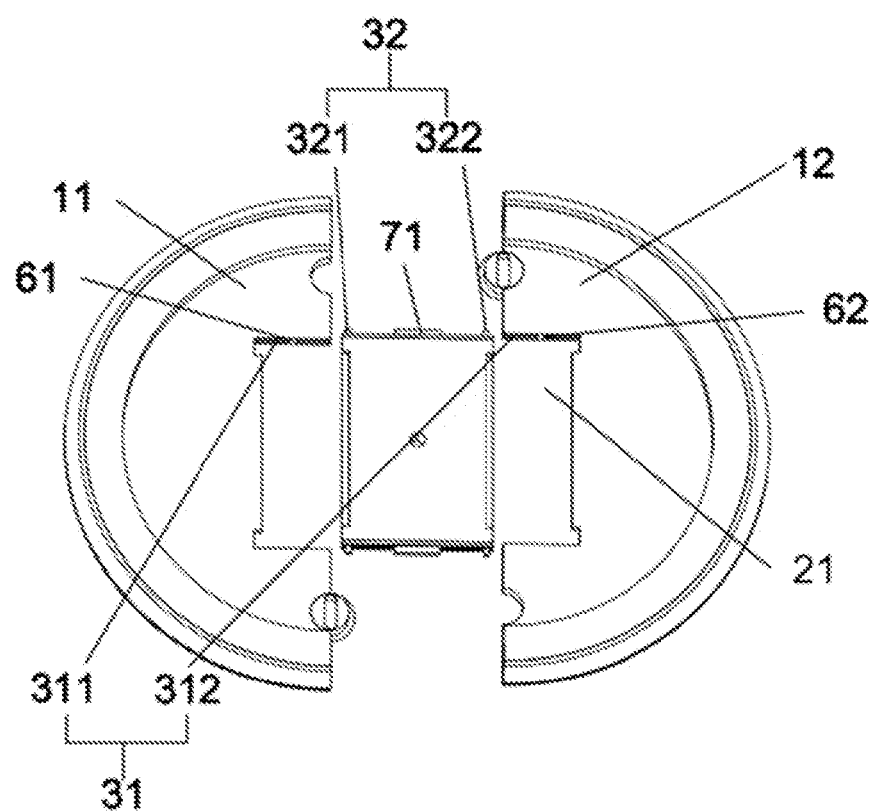
FIG. 7 is another exploded structural view of the folding wheel in the first embodiment.

In addition, the folding wheel may be provided with a first stop structure in the first rail groove 31, and may be provided with a second stop structure disposed in the second rail groove 33, for limiting a separation distance between the two wheel plates. As illustrated in FIG. 7, the first stop structure may comprise: a first left stop block 61 disposed in the first left rail portion 311, and a first right stop block 62 disposed in the first right rail portion 312. Similarly, as illustrated in FIG. 6, the second stop structure may comprise: a second left stop block 63 disposed in the second left rail portion 331, and a second right stop block 64 disposed in the second right rail portion 332.

When the two wheel plates are pulled away from each other, the first left rotating shaft 321 slides in the first left rail portion 311, and after sliding for a preset distance, abuts against the first left stop block 61. At this point, the position of the left wheel plate 11 is the extreme distance for pulling the left wheel plate 11. Likewise, the right wheel plate 12, after sliding for a preset distance, also abuts against the first right stop block 62, which is the extreme distance for pulling the right wheel plate 12. The first stop structure may prevent disengagement of the first rotating shaft 32 from the first rail groove 31 caused by pulling the wheel plates with an excessive distance.

To ensure sliding trajectory of the two wheel plates, the first connecting element 4 is provided with a first guiding strip 71 disposed between the first left rotating shaft 321 and the first right rotating shaft 322, and a second guiding strip 72 disposed between the second left rotating shaft 341 and the second right rotating shaft 342. The first guiding strip 71 and the second guiding strip 72 are both arranged in a strip shape, with their respective length directions being along the splicing direction of the two wheel plates. When the left wheel plate 11 and the right wheel plate 12 are approaching towards each other, the left end of the first guiding strip 71 enters the first left rail portion 311, and the right end thereof enters the first right rail portion 312, so as to facilitate splicing of the two wheel plates and limit the splicing direction of the two wheel plates, thereby avoiding flipping difficulty about the first rotating shaft 32 during the splicing process.

When the first stop structure is provided in the first rail groove 31, the length of the first guiding strip 71 is limited. If the distance between the first left stop block 61 and the first right stop block 62 is set to a first preset length, to ensure correct splicing of the two wheel plates, the length of the first guiding strip 71 shouldn't be greater than the first preset length. In this embodiment, the length of the first guiding strip 71 is equal to the first preset length, such that after the two wheel plates are spliced, two ends of the first guiding strip 71 abut against the first left stop block 61 and the second right stop block 64, respectively, further improving stability of the spliced two wheel plates. Similarly, the second stop strip 72, which may have the same length as the first stop strip 71, guides the two wheel plates to be spliced via the second rail groove 33; this improves stability of the spliced two wheel plates.

Second Embodiment

Figure 8:
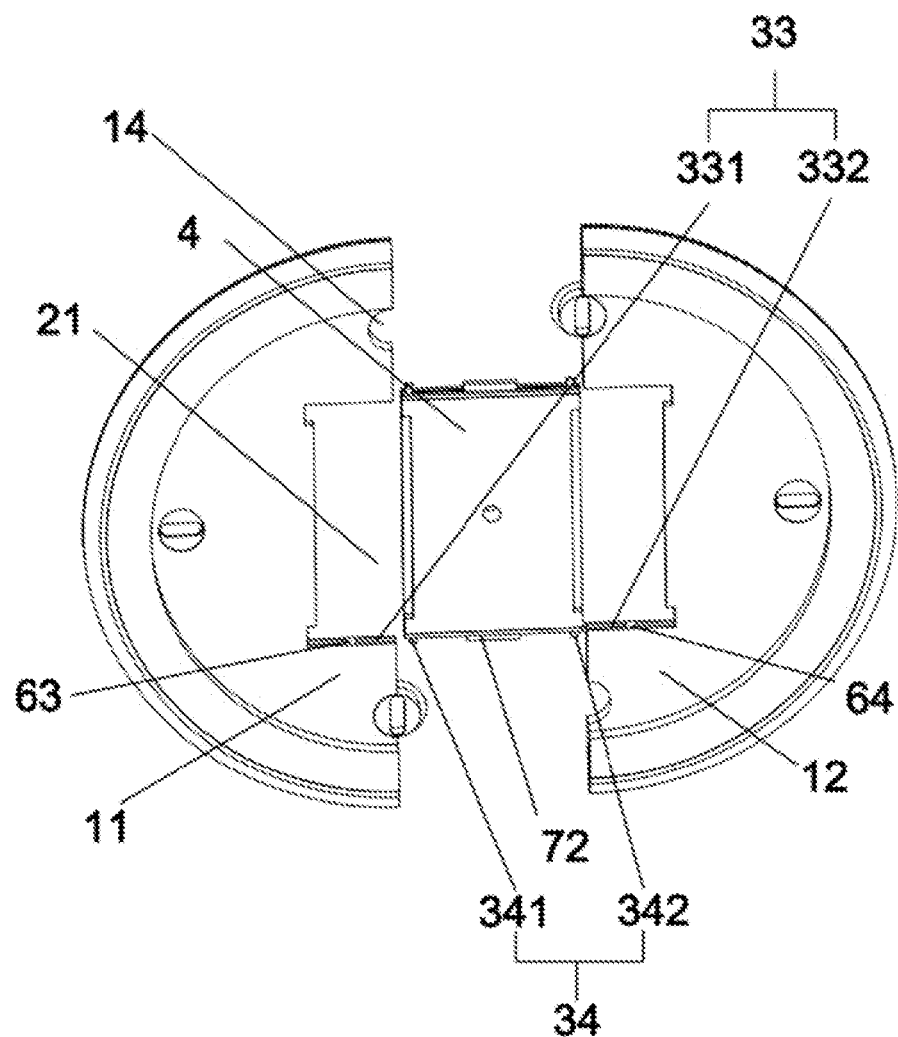
FIG. 8 is an exploded structural view of a folding wheel according to a second embodiment.
Figure 9:
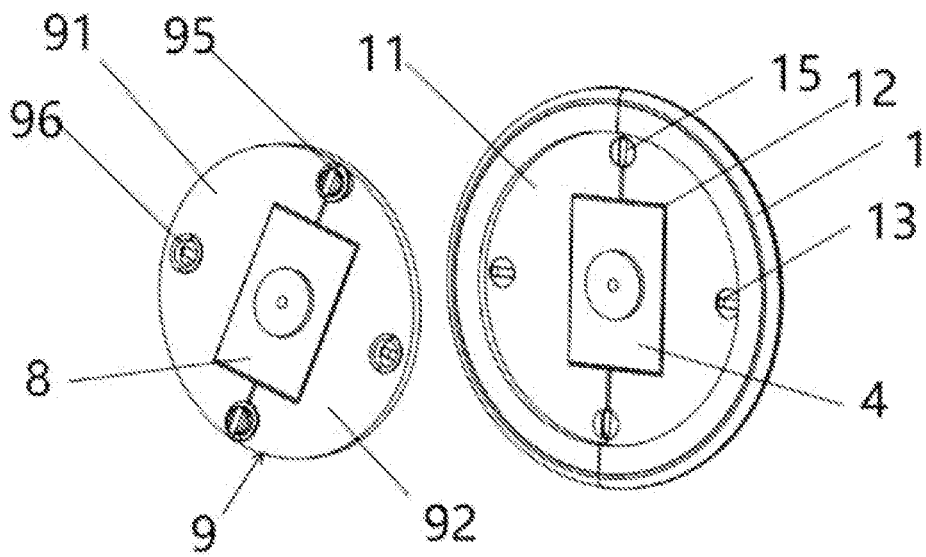
FIG. 9 is a structural schematic view of a plate body of the folding wheel in the second embodiment.

The second embodiment differs from the first embodiment in that a first fixing hole 13 is provided on one wheel plate, while a first splicing semi-hole 14 is provided on the wheel plate at the side spliced with the other wheel plate, as illustrated in FIG. 8 and FIG. 9. When the two wheel plates are spliced, the two first splicing semi-holes 14 communicate with each other to form a first splicing hole 15.

Figure 10:
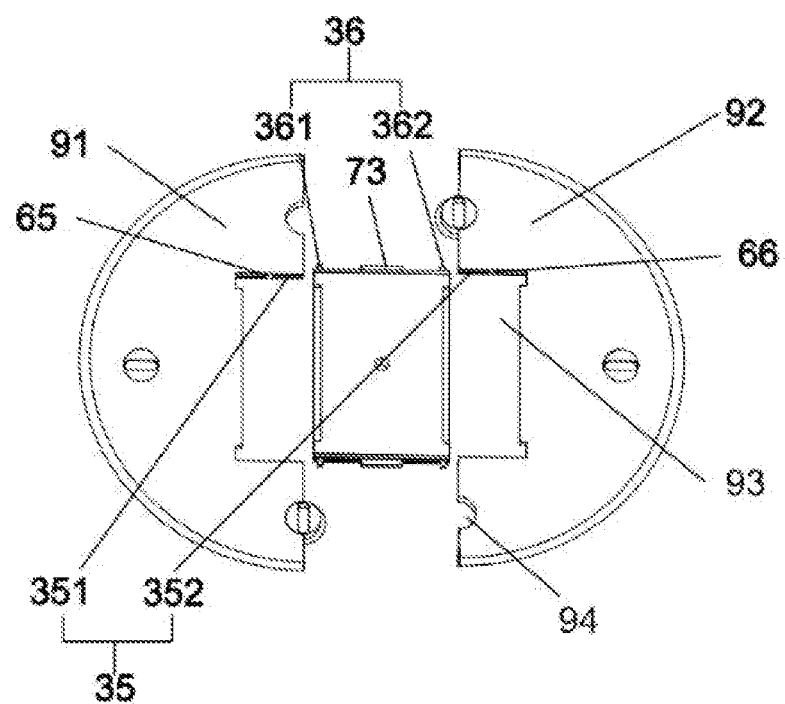
FIG. 10 is a structural schematic diagram of the plate body of the folding wheel in the second embodiment.

As illustrated in FIGS. 9 and 10, the securing mechanism may comprise: a plate body 9 including two fixed plates that can be spliced with each other, wherein a second splicing semi-hole 94 is provided for each fixed plate at the side facing the other fixed plate, such that when the two fixed plates are spliced with each other, an accommodating space 93 is formed therebetween, the two second splicing semi-holes 94 communicating with each other to form a second splicing hole 95; a second connecting element 8 provided in the accommodating space 93, configured for connecting the two fixed plates; and a third slide rail mechanism, which is at least partially disposed on the second connecting element 8, while remaining parts thereof are disposed on respective fixed plates, the third slide rail mechanism being configured for guiding splicing of the plate body 9. A pivoting axis may pass through respective central portion of the first connecting element 4 and the second connecting element 8 so as to be connected to the wheel axle of the bicycle, wherein the first connecting element 4 is rotatable relative to the second connecting element 8 about the pivoting axis; the securing mechanism may further comprise: a plug assembly 10 configured to secure the plate body 9 and the wheel body 1. The two fixed plates may comprise a left fixed plate 91 and a right fixed plate 92, respectively. The third slide rail mechanism may comprise a third rail groove 35 and a third rotating shaft 36 embedded in the third rail groove 35. The third rail groove 35 may comprise: a third left rail portion 351 provided on the left fixed plate 91, and a third right rail portion 352 provided on the right fixed plate 92.

Two third rotating shafts 36 may be optionally formed: a third left rotating shaft 361 and a third right rotating shaft 362, which are disposed at two ends of the second connecting element 8 on the same side, respectively. The third left rotating shaft 361 may be slidably inserted into the third left rail portion 351; and the third right rotating shaft 362 may be slidably inserted into the third right rail portion 352.

The securing mechanism may further comprise: a fourth slide rail mechanism arranged opposite to the third slide rail mechanism, comprising a fourth rail groove 37 and a fourth rotating shaft 38 embedded in the fourth rail groove 37. The fourth rail groove 37 may comprise: a fourth left rail portion 371 disposed on the left fixed plate 91, and a fourth right rail portion 372 disposed on the right fixed plate 92. The fourth rotating shaft 38 may comprise: a fourth left rotating shaft 381 coaxial with the third left rotating shaft 361, and a fourth right rotating shaft 382 coaxial with the third right rotating shaft 362, which may also be slidably inserted into the fourth left rail groove 371 and the fourth right rail groove 372, respectively. In this way, the left fixed plate 91 may flip relative to the second connecting element 8 about the respective axial center of the third left rotating shaft 361 and the fourth left rotating shaft 371, and the right fixed plate 92 may flip relative to the second connecting element 8 about respective axial center of the third right rotating shaft 362 and the fourth left rotating shaft 371, such that the locking mechanism may always be located on the wheel plates so as to lock the spliced wheel plates.

Figure 13:
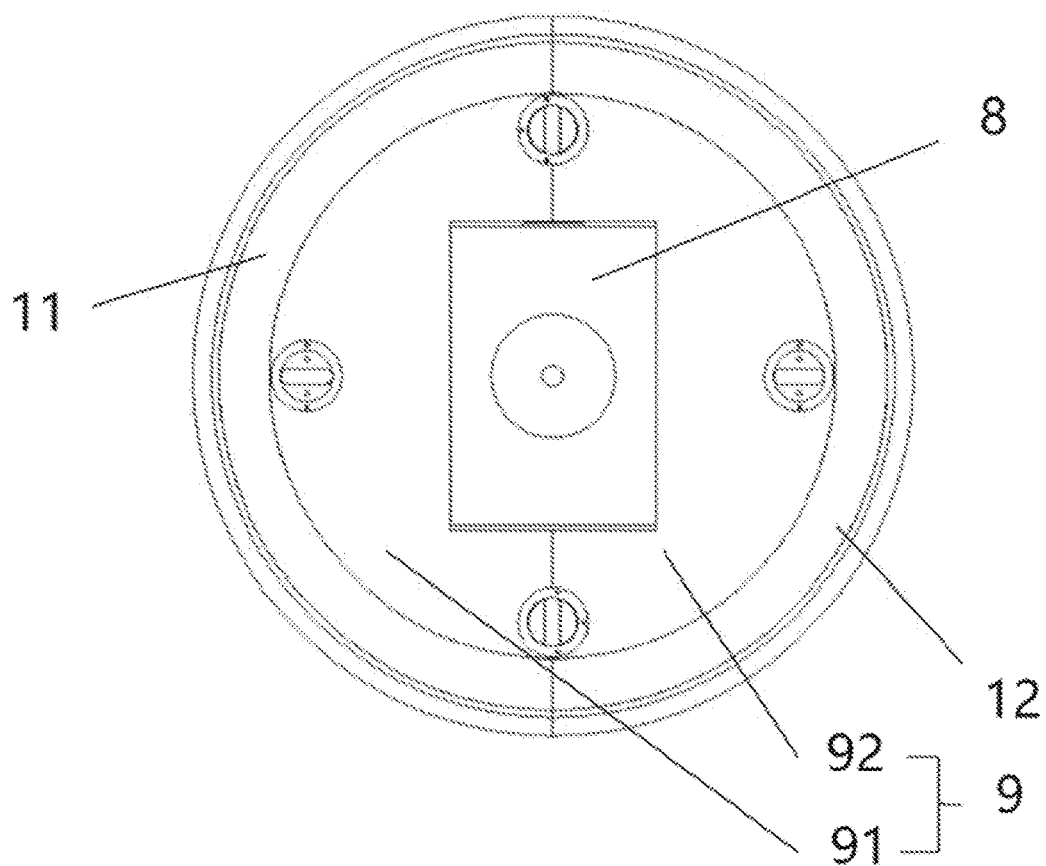
FIG. 13 is a structural schematic diagram of the spliced folding wheel in the second embodiment.
Figure 14:
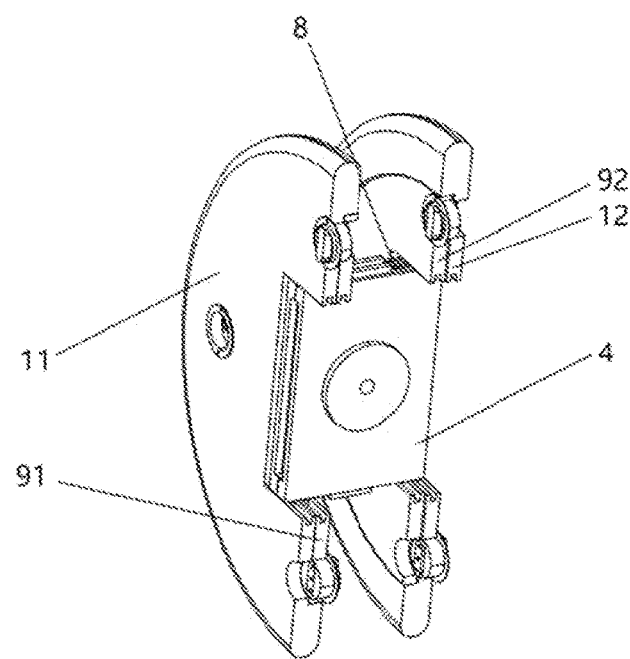
FIG. 14 is a structural schematic view of the flipped and folded folding wheel in the second embodiment.

FIGS. 13 and 14 illustrate a first preset position of the plate body 9, wherein the two fixed plates are in one-to-one correspondence with the two wheel plates and are engaged with each other; in this case, the securing mechanism does not lock the wheel plates; instead, the fixed plates may be folded together with the wheel plates. In this example, the left wheel plate 11 corresponds to the left fixed plate 91, and the right wheel plate 12 corresponds to the right fixed plate 92. However, in practices, it may also be the case that the left wheel plate 11 corresponds to the right fixed plate 92, and the right wheel plate 12 corresponds to the left wheel plate 11. When folding the wheel plates and the fixed plates, the wheel plates move integrally with the fixed plates engaged therewith. When the left wheel plate 11 and the right wheel plate 12 are pulled away from each other, the fixed plates engaged on respective wheel plates move together with the respective wheel plates. The fixed plates may flip relative to the second connecting element 8 as the wheel plates are flipped, thereby realizing synchronous flipping.

Figure 12:
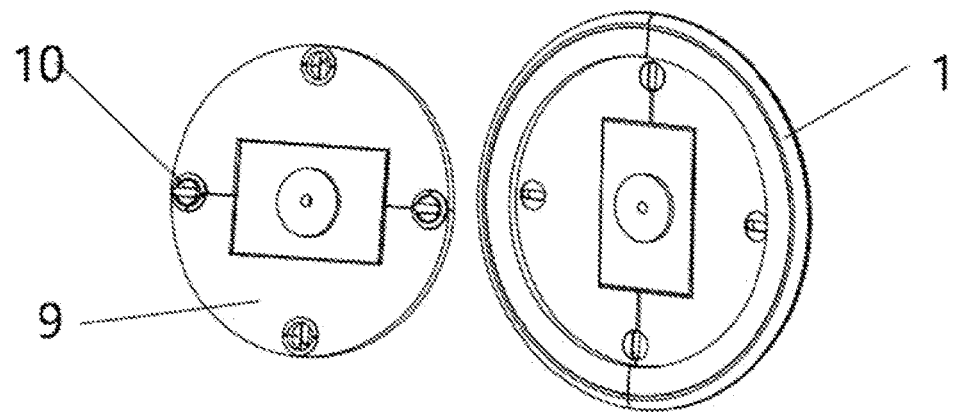
FIG. 12 is a structural schematic view when the plate body of the folding wheel is disposed at a second preset position in the second embodiment.

FIG. 12 illustrates a second preset position where the wheel plate 9 rotates with the second connecting element 8. To use the bicycle, the user needs to first splice the wheel plates and secure the wheel plates with the securing mechanism, such that the wheel plate 9 is located at the second preset position. At this point, the plate body 9 is engaged with the spliced wheel body 1 and is arranged coaxial with the wheel body 1. When the first connecting element 4 and the second connecting element rotate relative to each other, the plate body 9 and the wheel body 1 also rotate relative to each other. A second fixing hole 96 may also be provided on the plate body 9. The second splicing hole 95 formed by splicing of the second splicing semi-holes 94 on the two fixed plates coincides with the first fixing hole 13; the first splicing hole 15 formed by splicing of the first splicing semi-holes 14 on the two wheel plates coincides with the second fixing hole 96. The plug assembly 10 may simultaneously pass through both of the first fixing hole 13 and the second splicing hole 95, as well as through the first splicing hole 15 and the second fixing hole 96, so as to secure the wheel body 1 and the plate body 9 to the spliced state, offering the user a safe riding.

To ensure securing reliability, two first splicing hole 15, two second splicing hole 95, two first fixing hole 13, and two second fixing hole 96 may be optionally provided, wherein the two second fixing holes 96 and the two second splicing holes 95 are symmetrical with respect to the axial center of the plate body 9, and the two first fixing holes 13 and the two first splicing holes 15 are symmetrical with respect to the axial center of the wheel body 1, wherein reliability is enhanced by the dual plug-locking. It is noted that the position where the second splicing hole 95 and the first fixing hole 13 coincide is the second preset position, the second preset position being not limited to the position illustrated in the figure and being irrelevant to the rotating angle of the plate body 9 with the second connecting element 8. In actuality, the splicing line of the plate body 9 may have any angle with the splicing line of the wheel body 1. The plate body 9 at the first preset position, after rotating by the angle along with the second connecting element 8, reaches the second preset position.

Figure 11:
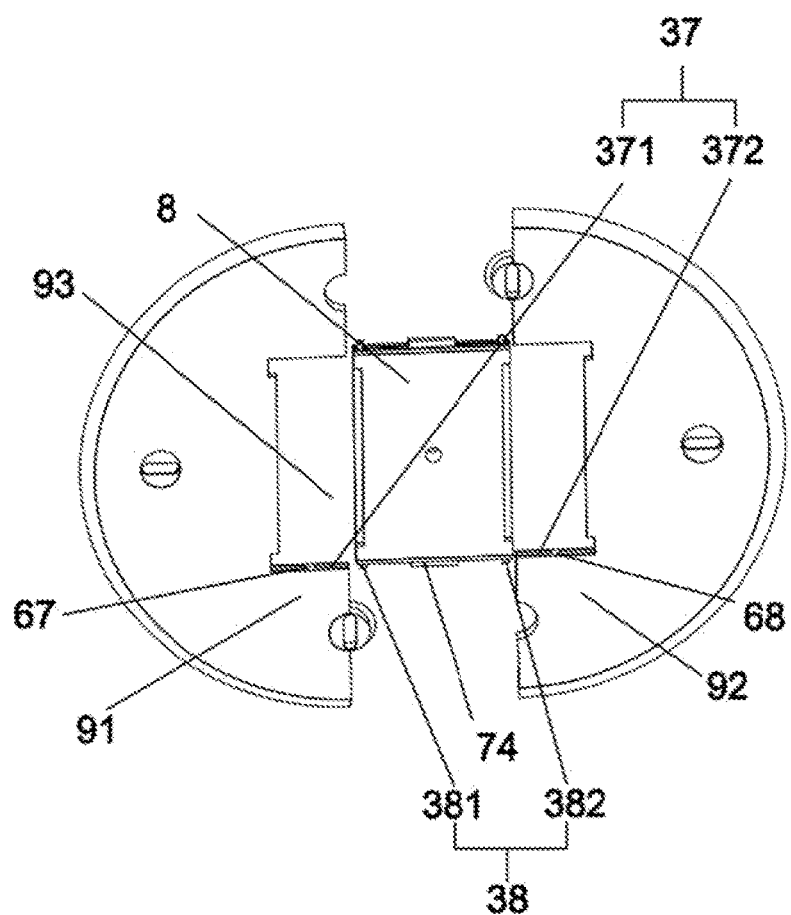
FIG. 11 is a structural schematic diagram of the plate body of the folding wheel in the second embodiment.

As illustrated in FIGS. 10 and 11, a third stop structure may be provided in the third rail groove 35, and a fourth stop structure may be provided in the fourth rail groove 37, wherein the third stop structure is configured for avoiding the third rotating shaft 36 from disengaging from the third rail groove 35, and the fourth strop structure is configured for avoiding the fourth rotating shaft 38 from disengaging from the fourth rail groove 37. Similar to the first stop structure, the third stop structure may comprise: a third left stop block 65 disposed in the third left rail portion 351, and a third right stop block 66 disposed in the third right rail portion 352. The fourth stop structure may comprise: a fourth left stop block 67 disposed in the fourth left rail portion 371, and a fourth right stop block 68 disposed in the fourth right rail portion 372. A third guiding strip 73 may be provided between the third left rotating shaft 361 and the third right rotating shaft 362, and a fourth guiding strip 74 may be provided between the fourth left rotating shaft 381 and the fourth right rotating shaft 382. The third guiding strip 73 and the fourth guiding strip 74 are both arranged in a strip shape, so as to guide splicing of the fixed plates and enhance stability of the spliced fixed plates.

In addition, to enhance splicing stability, when the two wheel plates of the wheel body 1 are spliced, the first connecting element 4 and the two wheel plates may be clamped with each other; and when the two fixed plates of the wheel body 9 are spliced, the second connecting element 8 and the two fixed plates may be clamped with each other.

Figure 15:
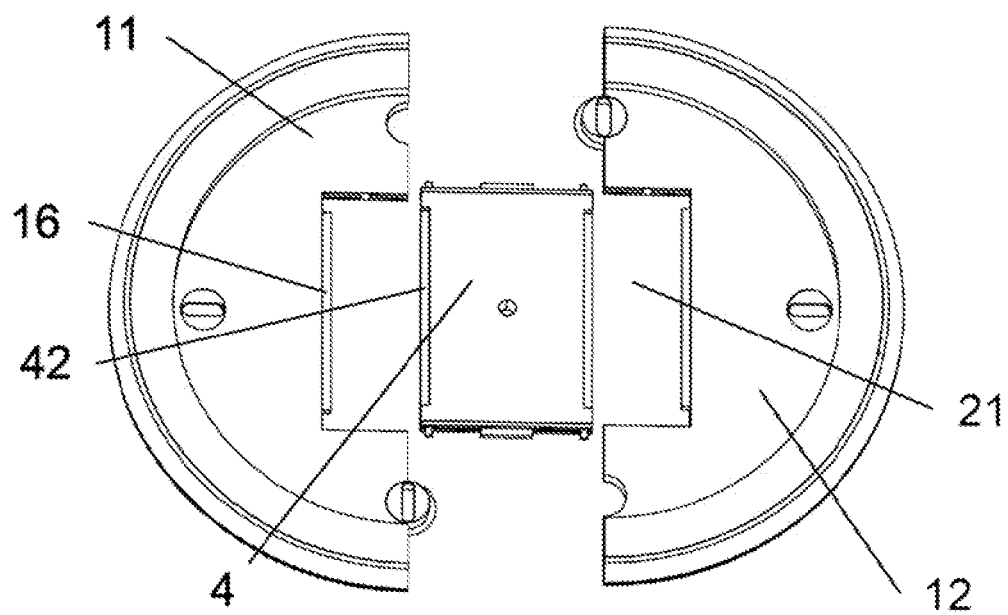
FIG. 15 is an exploded structural view of the wheel body in the second embodiment.

As illustrated in FIG. 15, a first clamping portion 16 is projected on a sidewall of the notch 21 on each of the wheel plates, and a first clamping groove 42 is provided at each of the two sides of the first connecting element 4 in the splicing direction. When the two wheel plates are spliced, the first clamping portions 16 on the wheel plates are snapped into the corresponding first clamping grooves 42, thereby implementing clamping between the first connecting element 4 and the two wheel plates, which further improves splicing stability. Likewise, as illustrated in FIG. 13, the fixed plates may also be clamped with the second connecting plate 8 upon splicing.

Figure 16:
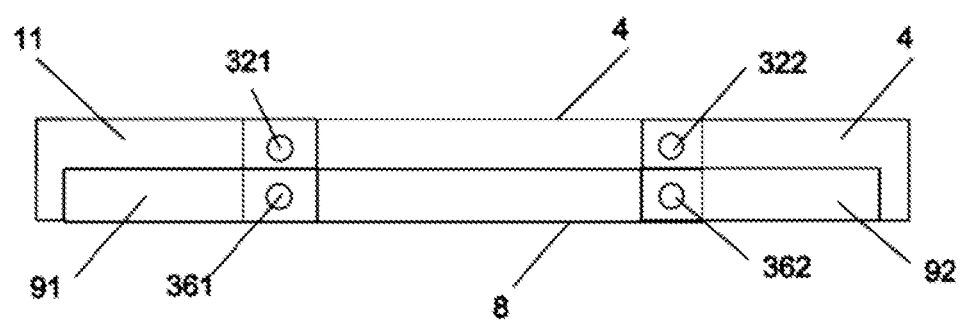
FIG. 16 is a sectional view of the wheel body and the plate body of the folding wheel before rotation in the second embodiment.

It is noted that when the wheel plates and the fixed plates are rotating synchronously, the wheel plates are easily obstructed such that the flipping cannot proceed smoothly. In FIG. 16, the illustration is made with the left wheel plate 11 and the left fixed plate 91 as an example. Since the first left rotating shaft 321 and the third left rotating shaft 361 are arranged opposite in the thickness direction of the first connecting element 4, when the left wheel plate 11 and the left fixed plate 91 are flipped synchronously, if the left fixed plate 91 rotates towards the direction of the first left rotating shaft 321, the first left rotating shaft 321 obstructs rotation of the left fixed plate 91; if the left fixed plate 91 rotates opposite to the direction of the first left rotating shaft 321, i.e., the left wheel plate 11 rotates towards the direction of the third left rotating shaft 361, the third left rotating shaft 361 obstructs rotation of the left wheel plate 11. Irrespective of to which directions the wheel plates and the fixed plates are rotated, they are still obstructed by the rotating shafts.

In view of the above, in this embodiment, as illustrated in FIG. 17, the first left rotating shaft 321 and the third left rotating shaft 351 are staggered in the thickness direction of the first connecting element 4, e.g., the distance between the first left rotating shaft 321 and the first right rotating shaft 322 is configured smaller than the distance between the third left rotating shaft 351 and the third right rotating shaft 352. In this way, when the left fixed plate 91 rotates towards the direction of the first left rotating shaft 321, the first rotating shaft 321 does not obstruct the left fixed plate 91 thereby ensuring smooth flipping of the fixed plates. It is also the case for the right fixed plate 92.

The securing mechanism in this embodiment offers advantages of secure fixation and easy operation; moreover, the secured engagement between the plate body 9 and the wheel body 1 may enhance rigidity and stability of the folding wheel during service.

Third Embodiment

The third embodiment is substantially identical to the second embodiment. A main difference is illustrated in FIG. 18, wherein a first slideway 41 is provided on the first connecting element 4 in the direction of mutual splicing of the two wheel plates. The first slideway 41 is disposed on the first connecting element 4 at the side where the first left rotating shaft 321 and the first right rotating shaft 322 are disposed, the first left rotating shaft 321 and the first right rotating shaft 322 being both disposed in the first slideway 41.

When the left fixed plate 91 rotates towards the direction of the first left rotating shaft 32 such that the left rotating plate 11 rotates synchronously with the left fixed plate 91, the rotating left fixed plate 91 is engaged with the first left rotating shaft 321, pushing the first left rotating shaft 321 to slide rightward in the first slideway 41. In this way, the left fixed plate 91 may rotate smoothly and flip synchronously with the left rotating plate 11. To use the folding wheel, it is needed to resume the folding wheel from the folded position to the service position, wherein the left wheel plate 11 is flipped till being in flush with the first connecting element 4, and the left fixed plate 91 is flipped till being in flush with the second connecting element 8. When the left fixed plate 91 and the left wheel plate 11 are flipping synchronously, the left wheel plate 11 pulls the first left rotating shaft 321 via a groove wall of the first left rail portion 311, causing the first left rotating shaft 321 to slide leftwards in the first slideway 41 till the position aligned with the third left rotating shaft 361, thereby ensuring that the left wheel plate 11 and the left fixed plate 91 may move synchronously in the splicing direction. Likewise, rotating of the right fixed plate 92 towards the first right rotating shaft 322 pushes the first right rotating shaft 322 to slide leftwards in the first slideway 41; when returning to the service position, the right wheel plate 12 pulls the first right rotating shaft 322 via a groove wall of the first right rail portion 312 to slide rightwards in the first slideway 41 till the position aligned with the third right rotating shaft 362, thereby ensuring that the right wheel plate 12 and the right fixed plate 92 may move synchronously in the splicing direction.

To enable the fixed plates and the wheel plates to flip towards any direction, a second slideway 81 may be provided on the second connecting element 8 at the side wherein the third left rotating shaft 361 and the third right rotating shaft 362 are located along the direction of splicing the two fixed plates. When the left wheel plate 11 rotates towards the direction of the third left rotating shaft 361 such that the left wheel plate 11 rotates synchronously with the left fixed plate 91, the rotating left wheel plate 11 is engaged with the third left rotating shaft 361, pushing the third left rotating shaft 361 to slide rightwards in the second slideway 81, such that the left wheel plate 91 may rotate smoothly, realizing synchronous flipping with the left fixed plate 91. It is also the case for the right wheel plate 12 and the right fixed plate 92.

With the first slideway 41 and the second slideway 81, the folding wheel in this embodiment ensures a smooth rotation when the wheel plates and the fixed plates rotate synchronously, which avoids occurrence of jamming or flipping obstruction in the course of folding the wheel body 1, thereby improving operation friendliness.

Fourth Embodiment

Figure 20:
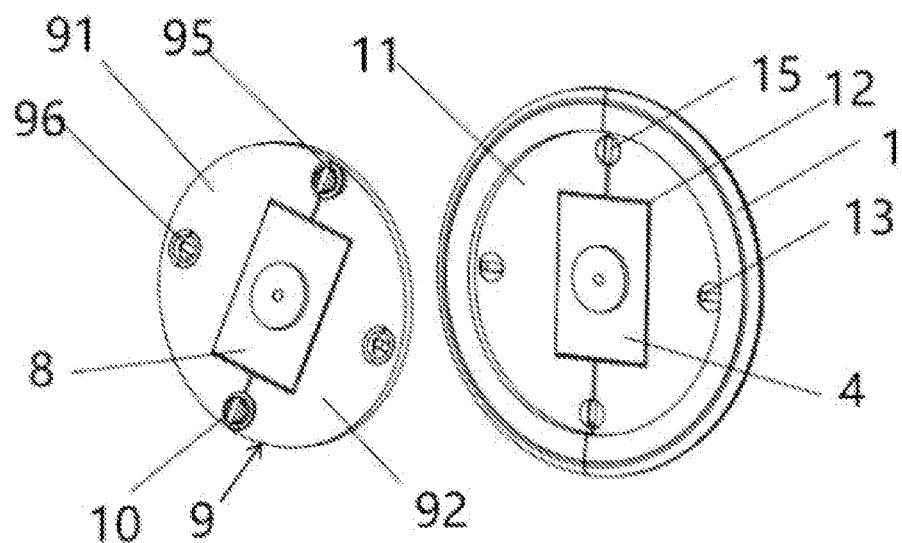
FIG. 20 is a structural schematic view of the plate body of the folding wheel in the fourth embodiment, wherein the plate body is at a first preset position.

A main improvement of the fourth embodiment lies in that the plug assembly 10 is not simply plugged in the second splicing hole 95 and the first fixing hole 13. As illustrated in FIGS. 19 and 20, the plug assembly 10 is provided in each of the first splicing hole 15 and the second splicing hole 95, wherein the plug assembly 10 comprises: a turn-button fastener 101, a connecting plug 102, a spring 103, a connecting element 104, a first turn-button casing 105, and a second turn-button casing 106. The connecting plug 102 is secured to the turn-button fastener 101 via the connecting element 104, and the spring 103 is disposed between the connecting plug 102 and the turn-button fastener 101. The first turn-button casing 105 is secured to the first fixing hole 13, and the second turn-button casing 106 is secured to the second splicing hole 95. A hole with a shape matched with the connecting plug 102 is provided on each of the first turn-button casing 105 and the second turn-button casing 106. The plug assembly 102 passes sequentially through the holes on the first turn-button casing 105 and the second turn-button casing 106, and is disposed at the side of the second turn-button casing 106 facing away from the first turn-button casing 105. The turn-button fastener 101 is disposed at the side of the first turn-button casing 105 facing away from the second turn-button casing 106. The spring 103 abuts on the first turn-button casing 105.

Rotating of the turn-button fastener 101 brings the connecting plug 102 to rotate, causing the connecting plug 102 to be misaligned with the holes. At this point, pushed by the spring 103 abutting against the first turn-button casing 105, the turn-button fastener 101 moves away from the first turn-button casing 105. The connecting element 104 connects the turn-button fastener 101 and the connecting plug 102, such that when the connecting plug 102 is misaligned from the holes, the connecting plug 102 is obstructed by the second turn-button casing 106, whereby the connecting plug 102 and the turn-button fastener 101 are simultaneously fastened. The spring 103 not only serves to fasten, but also may provide enough friction to prevent the turn-button fastener 101 from rotating freely under a non-external force.

The plug assembly 10 provided by the disclosure not only offers a good fastening effect, but also may implement quick installation and disassembly.

The connecting element 104 may be a screw or a linkage that implements connection via snap-fitting, or welding. The first turn-button casing 105 and the second turn-button casing 106 may be fixed using a fixing ring 107 or an alternative securing mechanism. Optionally, a recess may be provided on the first turn-button casing 105, wherein the turn-button fastener 101 and the spring 103 are disposed at the side where the recess is provided. The recess can better limit the spring 103, playing a protective role.

Figure 21:
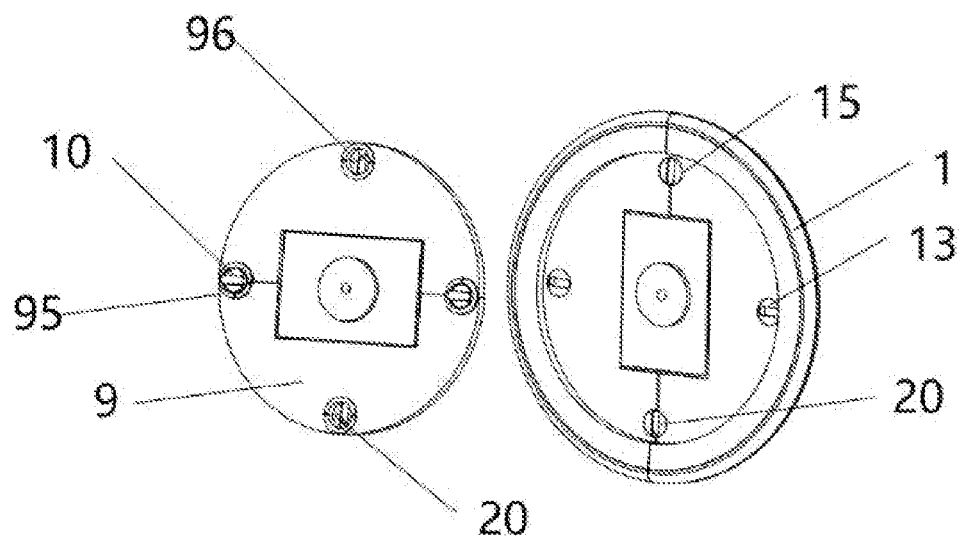
FIG. 21 is a structural schematic view of the plate body of the folding wheel in the fourth embodiment, wherein the plate body is at a second preset position.
Figure 22:
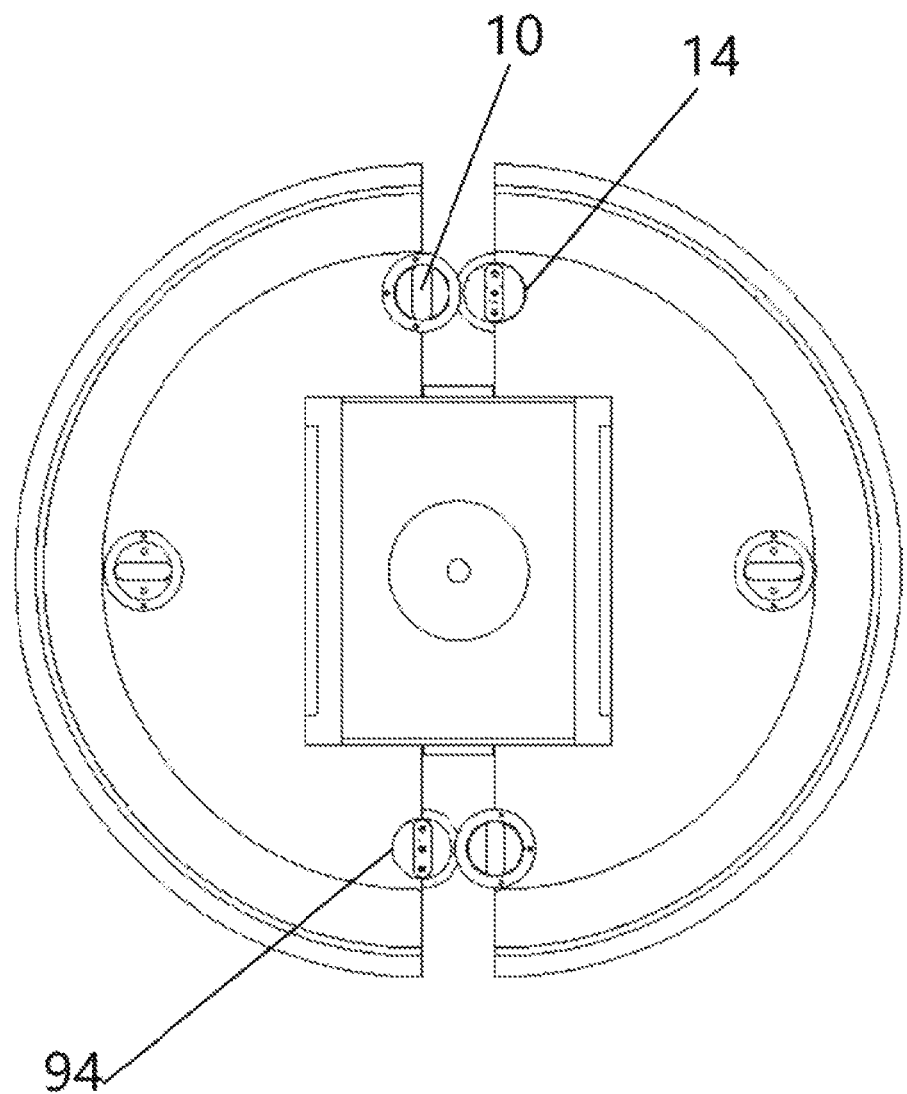
FIG. 22 is a structural schematic diagram of the being spliced folding wheel in the fourth embodiment.

To put the bicycle in use, the plate body 9 is initially located at the first preset position illustrated in FIG. 20. Now, the user may rotate the turn-button fastener 101 such that the connecting plug 102 is aligned with the holes provided on the first turn-button casing 105 and the second turn-button casing 106; and as such, by removing the turn-button fastener 101 and the connecting plug 102 which are connected via the connecting element 104, the wheel body 1 may be freely flipped, separated or spliced. When the plate body 9 is disposed at the second preset position illustrated in FIG. 21, the user may rotate the turn-button fastener 101 to misalign the connecting plug 102 with the holes provided on the first turn-button casing 105 and the second turn-button casing 106, thereby implementing relevant fixation between the turn-button fastener 101 and the connecting plug 102. Under obstruction by the plate body 9, the wheel body 1 can be firmly fixed.

Fifth Embodiment

The fifth embodiment of the disclosure relates to a portable appliance, comprising the folding wheel illustrated in any one of the first to fourth embodiments. The portable appliance also achieves the same technical effect as disclosed in any of the above embodiments.

The folding wheel provided by the embodiments of the disclosure is not limited to being applied to bicycles. The portable appliance according to the disclosure may not only be a bicycle, but also may be any wheeled portable appliance such as a wheelchair, monocycle, or even kids' bikes, or any wheeled mobile toy. Any demand on portability and foldability may apply the folding wheel to achieve a reliable portable effect.

Those of normal skill in the art may understand that many technical details provided in the various embodiments above are only for readers to understand better. However, the technical solutions as claimed in the appended claims may be substantially implemented even without these technical details. In actual applications, various alternations to the embodiments may be done in aspects of forms and details without departing from the spirit and scope of the present disclosure.

What is claimed is:

1. A folding wheel, comprising:
  a wheel body (1) including two wheel plates that can be spliced with each other, wherein a notched area (2) is formed therebetween when the two wheel plates are spliced with each other;
  a first connecting element (4) disposed in the notched area (2);
  a first slide rail mechanism, at least part of which is arranged on the first connecting element (4), and remaining parts of which are arranged on respective wheel plates, wherein the first slide rail mechanism includes a first rail groove (31) and a first rotating shaft (32) inserted in the first rail groove (31), the two wheel plates being configurable to be spliced with or separated from each other along the first rail groove (31) and configurable to be flipped relative to the first connecting element (4); and
  a securing mechanism configurable to secure the two wheel plates to in a mutually spliced state.

2. The folding wheel according to claim 1, wherein a first stop structure is provided on the first rail groove (31), the first stop structure being configured to obstruct relative movement of the first rotating shaft (32).

3. The folding wheel according to claim 2, wherein the two wheel plates include a left wheel plate (11) and a right wheel plate (12);
  the first rail groove (31) includes a first left rail portion (311) provided on the left wheel plate (11) and a first right rail portion (312) provided on the right wheel plate (12);
  the first rotating shaft (32) includes a first left rotating shaft (321) and a first right rotating shaft (322), wherein the first left rotating shaft (321) and the first right rotating shaft (322) are respectively disposed at two ends of the first connecting element (4) on the same side; the first left rotating shaft (321) is inserted into the first left rail portion (311), such that the left wheel plate (11) is movable along the first left rail portion (311); and the first right rotating shaft (322) is inserted into the first rail portion (312), such that the right wheel plate (12) is movable along the first right rail portion (312).

4. The folding wheel according to claim 3, wherein a first leading strip (71) is provided between the first left rotating shaft (321) and the first right rotating shaft (322); and
  when the left wheel plate (11) and the right wheel plate (12) are moving toward each other along the first rail groove (31), the first leading strip (71) is inserted in the first rail groove (31) so as to facilitate guiding the two wheel plates to be spliced; and when the left wheel plate (11) and the right wheel plate (12) are moving away from each other along the first rail groove (31), the first leading strip (71) is disengaged from the first rail groove (31) such that the wheel plates are flipped with the first rotating shaft (32).

5. The folding wheel according to claim 4, wherein the stop structure includes:
  a first left stop block (61) disposed in the first left rail portion (311), configured to obstruct relative movement of the first left rotating shaft (321); and
  a first right stop block (62) disposed in the first right rail portion (312), configured to obstruct relative movement of the first right rotating shaft (322);
  wherein when the two wheel plates are spliced, two ends of the first leading strip (61) abut against the first left stop block (61) and the first right stop block (62), respectively.

6. The folding wheel according to claim 1, wherein a notch (21) is formed on each of the two wheel plates, the respective notches (21) are configured to form the notched area (2) when the two wheel plates are spliced with each other, such that after the wheel plates are flipped relative to the first connecting element (4),
  the first connecting element (4) is snapped into the notches (21) of the wheel plates along the first rail groove (31) via the first rotating shaft (32); wherein the folding wheel further includes:
  a second slide rail mechanism, at least part of which is disposed on the first connecting element (4), and remaining parts of which are disposed on the respective wheel plates, wherein the second slide rail mechanism includes a second rail groove (33) and a second rotating shaft (34) inserted in the second rail groove (33), the second rail groove (33) is disposed opposite to the first rail groove (34), and the second rotating shaft (34) and the first rotating shaft (32) are coaxially arranged.

7. The folding wheel according to claim 1, wherein the securing mechanism includes:
- a plate body (9) including two fixation plates that can be spliced with each other, wherein a second split semi-hole (94) is provided for each fixation plate at the side spliced with the other fixation plate, such that when the two fixation plates are spliced with each other, a receiving space (93) is formed therebetween; and the two second split semi-holes (94) communicate with each other to form a second split hole (95);
- a second connecting element (8) disposed in the receiving space (93);
- a third slide rail mechanism, at least part of which is disposed on the second connecting element (8), and remaining parts of which are disposed on the respective fixation plates; the third slide rail mechanism includes a third rail groove (35) and a third rotating shaft (36) inserted into the third rail groove (35); and
- a pivoting axis, which passes through respective central portion of the first connecting element (4) and the second connecting element (8), such that the first connecting element (4) is rotatable relative to the second connecting element (8) along the pivoting axis; wherein
- a first fixation hole (13) is further provided on the wheel body (1);
- when the plate body rotates with the second connecting element (8) till a first preset position, with translational movement of the wheel plates, the two fixation plates can be spliced with or separated from each other along the third rail groove (35), and with flipping of the wheel plates, the two fixation plates can be flipped relative the second connection element (8); and
- the securing mechanism further includes an insert (10), wherein when the plate body rotates with the second connecting element (8) till a second preset position, the first fixation hole (13) is coincident with the second split hole (95) such that the insert (10) passes through the fixation hole (13) and the second spit hole (95) to secure both the wheel plates and the plate body to a spliced state.

8. The folding wheel according to claim 7, wherein the first rotating shaft (32) is slidably provided on the first connecting element (4), wherein rotation of the fixation plates towards the first rotating shaft (32) along the third rotating shaft (36) pushes the first rotating shaft (32) to slide on the first connecting element (4); and
the third rotating shaft (36) is slidably provided on the second connecting element (8), wherein rotating of the wheel plates towards the third rotating shaft (36) along the first rotating shaft (32) pushes the third rotating shaft (36) to slide on the second connecting element (8).

9. The folding wheel according to claim 8, wherein a first split semi-hole (14) is provided on each of the wheel plates at the sides spliced with the other wheel plate, such that when the two wheel plates are spliced with each other, the two first split semi-holes (14) communicate with each other to form a first split hole (15); and
a second fixation hole (96) is provided on the plate body, wherein when the plate body rotates with the second connecting element (8) till the second preset position, the insert (10) passes through the first split hole (15) and the second fixation hole (96) to fix the plate body to the wheel plates.

10. The folding wheel according to claim 9, wherein two first split holes (15) and two first fixation holes (13) are provided, respectively, wherein a link line between the two first split holes (15) and a link line between the two first fixation holes (13) assume a preset angle with respect to each other;
two second split holes (95) and two second fixation holes (96) are provided, respectively, wherein a link line between the two second split holes (95) and a link line between the two second fixation holes (96) assume a preset angle with respect to each other; and
the plate body at the first preset position rotates with the second connecting element for a preset angle till reaching the second preset position.

11. The folding wheel according to claim 10, wherein the insert (10) is provided in each of the first split holes (15) and each of the second split holes (95), the insert (10) comprising:
a knob fastener (101), an insert head (102), a spring (103), a connecting element (104), a first knob casing (105), and a second knob casing (106);
wherein the insert head (102) is secured on the knob fastener (101), and the spring (103) is disposed between the insert head (102) and the knob fastener (101);
the first knob casing (105) is secured on the first fixation hole (13), the second knob casing (106) is secured on the second split hole (95); and a hole with a shape matched with the insert head (102) is provided on each of the first knob casing (105) and the second knob casing (106);
the inset head (102) runs sequentially through the holes provided on the first knob casing (105) and the second knob casing (106) till being disposed at the side of the second knob casing (106) opposite to the first knob casing (105); and
the knob fastener (101) is disposed at the side of the first knob casing (105) opposite to the second knob casing (106), and the spring (103) abuts against the first knob casing (105).

12. A portable appliance, comprising the folding wheel according to claim 1.

* * * * *